United States Patent [19]
Byers

[11] Patent Number: 5,546,692
[45] Date of Patent: Aug. 20, 1996

[54] DEER DECOY

[76] Inventor: Mark D. Byers, 2203 E. 11 Mile Rd., Royal Oak, Mich. 48067

[21] Appl. No.: 366,824

[22] Filed: Dec. 30, 1994

Related U.S. Application Data

[63] Continuation-in-part of Ser. No. 328,441, Oct. 25, 1994, abandoned.

[51] Int. Cl.$^6$ ................................................ A01M 31/06
[52] U.S. Cl. ............................................ 43/2; 43/1
[58] Field of Search ................................................ 43/1, 2

[56] References Cited

U.S. PATENT DOCUMENTS

| | | |
|---|---|---|
| 3,916,553 | 11/1975 | Lynch et al. |
| 4,773,178 | 9/1988 | Marek |
| 4,821,444 | 4/1989 | Remus |
| 4,852,288 | 8/1989 | Payne et al. |
| 4,896,448 | 1/1990 | Jackson |
| 5,233,780 | 8/1993 | Overholt |
| 5,289,654 | 3/1994 | Denny |
| 5,335,438 | 8/1994 | Terrill ............................. 43/1 |

*Primary Examiner*—Kurt Rowan
*Attorney, Agent, or Firm*—Barnes, Kisselle, Raisch, Choate, Whittemore & Hulbert, P.C.

[57] ABSTRACT

A deer decoy comprising a plastic body having opposed sides, each side simulating the rear end of a standing deer. A tail is associated with each side. The tails are mounted on a common shaft for bodily rotation about an axis near their upper ends such that the tails are gravitationally biased to normally hang in a position simulating a natural relaxed condition of repose. An exterior pull string and/or a mechanism within the body is controlled to move the tail relative to said body out of the repose position. The body is made of solid foam plastic or hollow and of two substantially identical halves joined together. The deer decoy body include recesses defining a downwardly open channels along each leg portion of the body rear end and a rod is telescoped in each channel for engaging the ground to support the decoy in standing position spaced above the ground. The decoy is three-dimensionally sculptured to life-like scale along X and Y dimensional coordinate axes at a scale greatly reduced from the X-Y scale along main decoy viewing Z axis so as to appear abnormally thin when viewed along the Z axis.

33 Claims, 4 Drawing Sheets

5,546,692

DEER DECOY

This application is a continuation-in-part application of U.S. application Ser. No. 08/328,441, filed Oct. 25, 1994, now abandoned.

This invention relates to deer decoys and particularly to deer decoys which involve motion.

BACKGROUND, OBJECTS AND SUMMARY OF THE INVENTION

Although it has heretofore been suggested that deer decoys should involve motion, none has been developed which provide a safe deer decoy for deer gun season; which will distract the attention of the deer away from the hunter, especially during bow season; and which provides a life-like movement. Consequently, prior decoys do not address the natural instinct of the deer herd to communicate danger or safety with one another; which recognize that deer have poor eye sight and that if deer are any appreciable distance from a stationary decoy that has no movement, the deer are prone to not notice it or recognize it. Existing deer decoys that are on the market are too dangerous to use during deer gun season because they are both full bodied and three dimensionally sculptured to full or reduced scale in all of the X, Y and Z cartesion dimensional coordinates. Hence such deer decoys pose the risk of someone shooting in the direction of the hunter regardless of hunting position relative to the decoy because such full bodied deer decoys appear lifelike from all decoy viewing angles in a horizontal 360° viewing pattern around the same. As far as the present inventor is aware, there are no safe decoys that emulate the movement of deer.

Among the objectives of the present invention are to provide a decoy that is life-like from a limited viewing angle so that no one will notice it or identify it as a deer from a side view; which decoy has a life-like movement of a deer's tail so as to attract the attention of other deer; which deer decoy provides the above in a safe manner for either bow hunters or gun hunters; which has a natural movement that will attract the attention of a deer and minimize the likelihood of the deer noticing the movements of the hunter; wherein the hunter has the ability to control how much movement transpires by the deer decoy's tail through an electronic radio control unit, or through an internal adjustable timing device or via a pull string; which attracts and draws deer to the decoy that would otherwise have not come in the area where the hunter would have a safe and clear shot at the game; and which is economical to manufacture and effective, reliable and durable in operation and use.

In accordance with one embodiment of the invention, a plastic body comprising two halves is provided which is a hollow three dimensional sculpture or body of the rear end of a deer in a standing position. The decoy replication of a deer is sculptured to full or reduced scale of a real deer along the X and Y coordinates, but made out-of-scale very thin along the Z coordinate. One side (exterior) of each half is a replica of a deer's rear end and the other opposite (interior) side is open and hollow the edges being flat. The sculpture includes a separate tail. This sculpture is duplicated and the two pieces are attached back to back to each other. There is a support system inside the hollow area of the two attached sculptures for the purpose of holding an electronic device which includes a small motor, rheostat, radio control, battery and metal drive rod which protrudes out of both sides of the decoy for purpose of attaching the two tails for conjoint rotation with the drive rod. This mechanism will enable the tails to move simultaneously to the right and the left (as separately viewed when looking at the opposite main exterior duplicate surfaces of the decoy) in a quick motion to simulate the life-like movement of a deer's tail when it is not alarmed and at rest. The amount of movement is controlled by the hunter with an internal timing device, or by a radio signal from a hand held transmitter or by manually pulling on a tail-attached string.

The decoy has two dowel rods stored inside the legs for the purpose of mounting the decoy in a standing position in the field. These rods are stored inside the decoy's legs and held there with a metal snap pin. Then the dowel rods are removed from inside the decoy and are pushed into the ground part way. The decoy is then slid onto the rods that are sticking out of the ground, in the same channels in the legs where the dowel rods were stored. The snap pins that were used to keep the legs secure while stored are then used to keep the dowel rods from sliding further into the leg storage area. The rods hold the decoy spaced approximately 12" off the ground. The height of the decoy including the dowel rod legs is preferably approximately 36" tall off the ground. On the top of the decoy, there is a hollow area for the purpose of holding a bottle of deer scent or a cotton swab of deer scent.

In another embodiment of the invention, the deer decoy comprises a solid plastic body wherein opposite main facing sides again each simulate a rear end of a deer. The decoy preferably also includes a removable plastic body having opposite main facing sides simulating a deer head, and removably carries thereon a set of solid plastic antlers. As in the first embodiment, the decoy replication of a standing deer hind end (as well as head and antlers) is sculptured three-dimensionally generally to life-like scale as to its X-Y dimensions in the decoy plane perpendicular to principal decoy viewing axis, whereas the Z dimensions of the decoy in the direction of this principal viewing axis are greatly reduced from the X-Y scale so as to render the decoy very thin and hence unnoticable, or at least unrecognizable as a deer, when viewing the decoy from either side (i.e., in a viewing angle range of say 90° centered on the Y axis perpendicular to the main decoy viewing on Z axis).

DESCRIPTION OF THE INVENTION

The foregoing as well as other objects, features and advantages of the present invention will become apparent from the following detailed description, appended claims and accompanying drawings (which are to scale unless otherwise indicated) wherein:

DETAILED DESCRIPTION OF THE PREFERRED EMBODIMENTS

Figure 1:
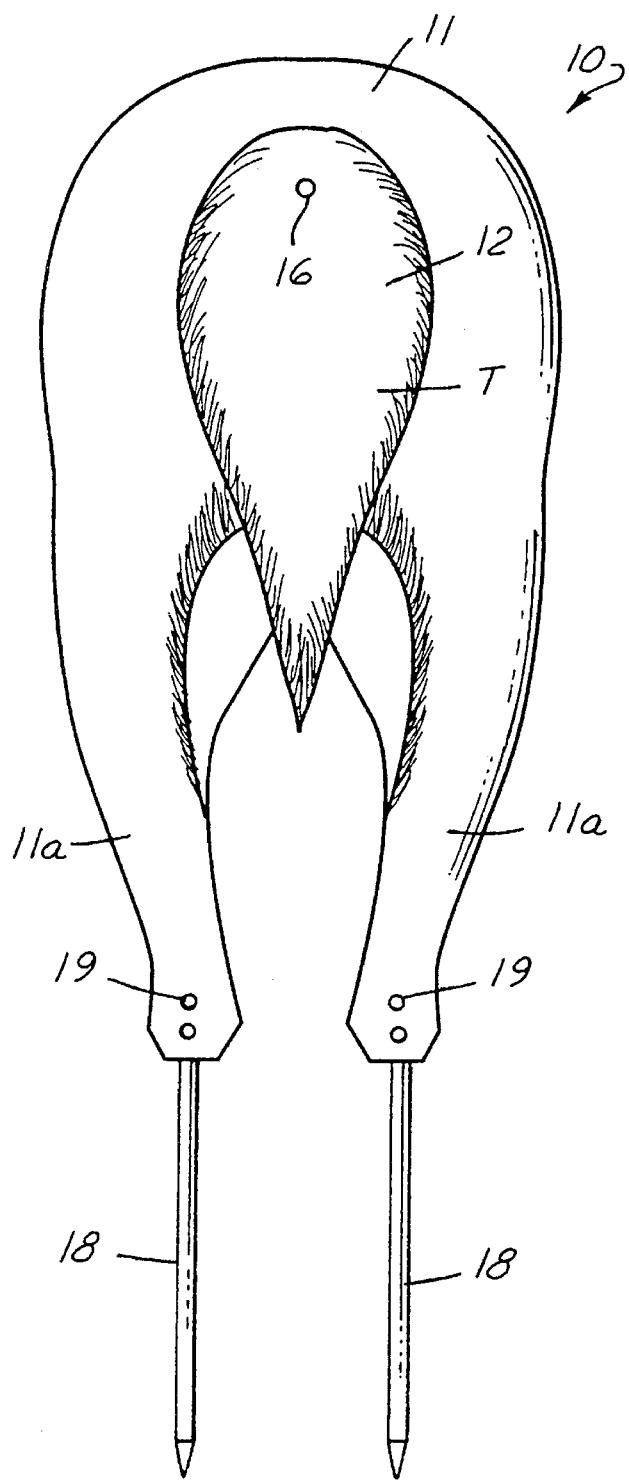
FIG. 1 is an elevation view of a deer rear-end replication decoy embodying the invention showing the decoy in position in the field as viewed along the main viewing (Z) axis.
Figure 2:
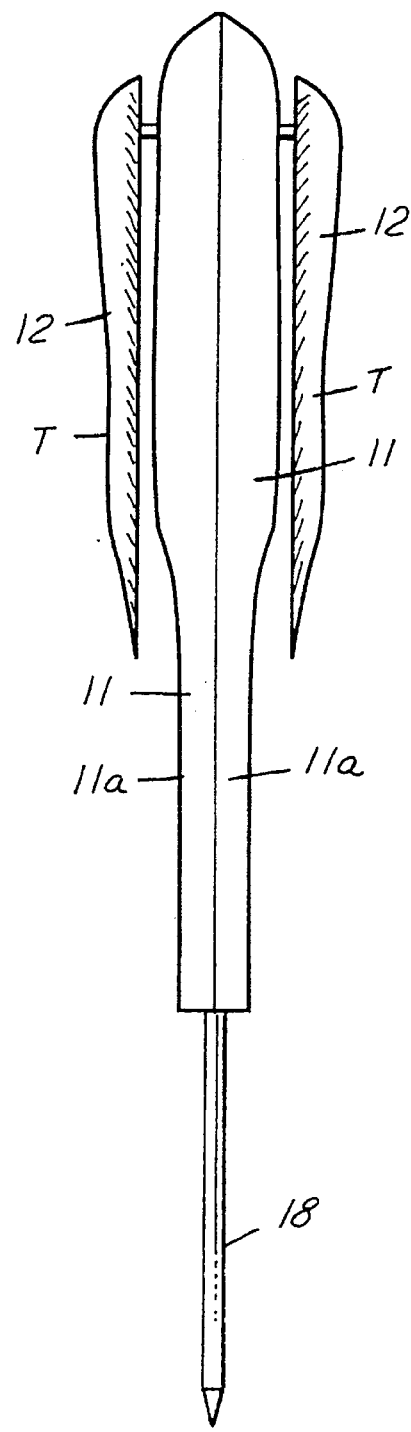
FIG. 2 is a side elevational view of the decoy as viewed along the Y axis perpendicular to the main viewing axis.
Figure 3:
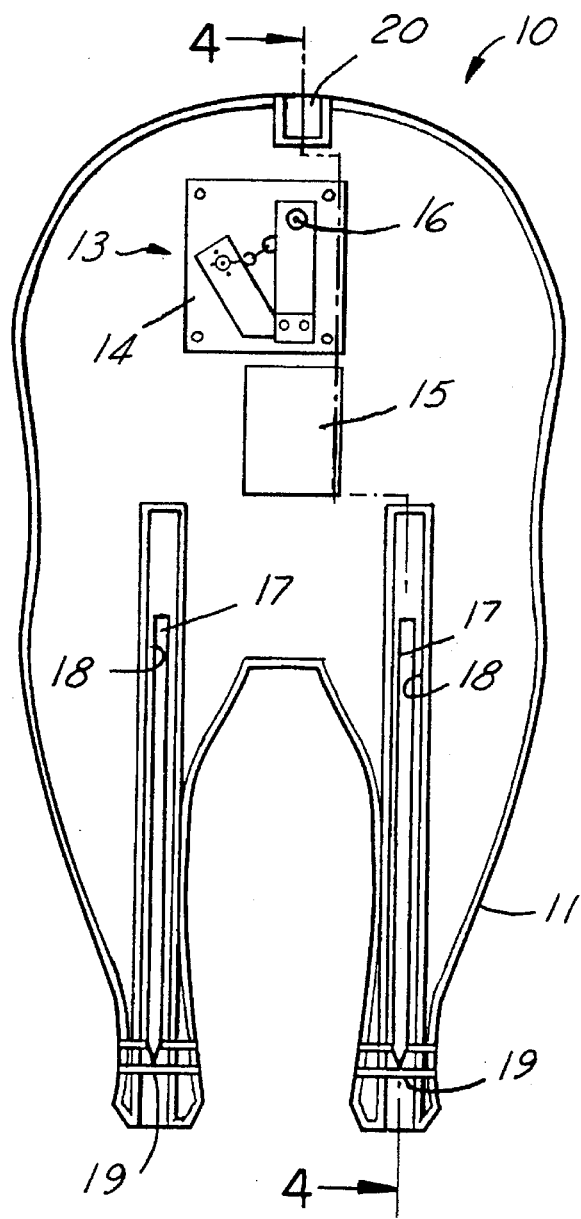
FIG. 3 is a sectional view on line 3—3 of FIG. 2 but with the legs in stored position.

Referring to FIGS. 1–6, in accordance with a first embodiment of the invention the deer decoy 10 illustrated in FIGS. 1–6 comprises two molded hollow plastic halves 11 which are joined to form a hollow three dimensional sculpture of the rear end of a deer approximately 2" thick (i.e. made very thin out-of-scale in "Z" dimension in the plane of the drawing in FIG. 2). One side of each half is a replica of a deer's rear end when in standing position (with its "X" and "Y" dimensions in the plane of the drawing in FIG. 1 preferably to actual or reduced to say one-half life scale) and the other side of each half is open and hollow and the edges are flat. The sculpture includes a separate tail 12 mounted outboard of each half of the decoy. The two halves 11 of the sculpture are attached back to back to each other. There are support system structures inside the hollow area of the two attached sculptures 11 for the purpose of holding an electronic device 13 which includes a small electric motor and timer 14 and a battery 15. A metal rod 16 protrudes out of both sides 11 of the decoy for purpose of attaching the two tails T. This mechanism will enable the tails T to be moved simultaneously in the same rotary direction and hence to the right and the left (as separately viewed when facing the same along the main viewing axis) in a quick motion to simulate the life-like flicking and relaxed movement of a deer's tail when it is not alarmed and at rest. It is believed that this flicking of the tail, by momentarily exposing the white under fur areas W (FIG. 1) is the primary reason the decoy will be noticed visually by the game deer. The amount of movement is controlled by the hunter with an internal timing device, or by a radio signal from a hand held transmitter, or a pull string.

The decoy 10 has two dowel rods 17 individually stored inside the legs 11a for the purpose of mounting the decoy 10 in a standing position in the field. These rods 17 are individually stored in complimentary grooves 18 inside the decoy's legs 11a and each held there with an associated metal snap pin 19. When the dowel rods 17 are to be used, the pins 19 are removed and the rods 17 are withdrawn from inside the decoy. The rods 17 are pushed into the ground part way, and then the decoy is slid onto the rods 17 that are sticking out of the ground, the upper ends of rods 17 being telescopically received in the same channels or grooves 18 where the rods 17 were stored. The snap pins 19 that were used to keep the rods secure while stored are now used to keep the dowel rods 17 from sliding further into the leg storage area. The rods 17 hold the decoy spaced approximately 12" off the ground. The height of the decoy including the dowel rod legs is preferably approximately 36" tall off the ground. On the top of the decoy, there is a hollow area 20 for the purpose of holding a bottle of deer scent or a cotton swab of deer scent.

Figure 7:
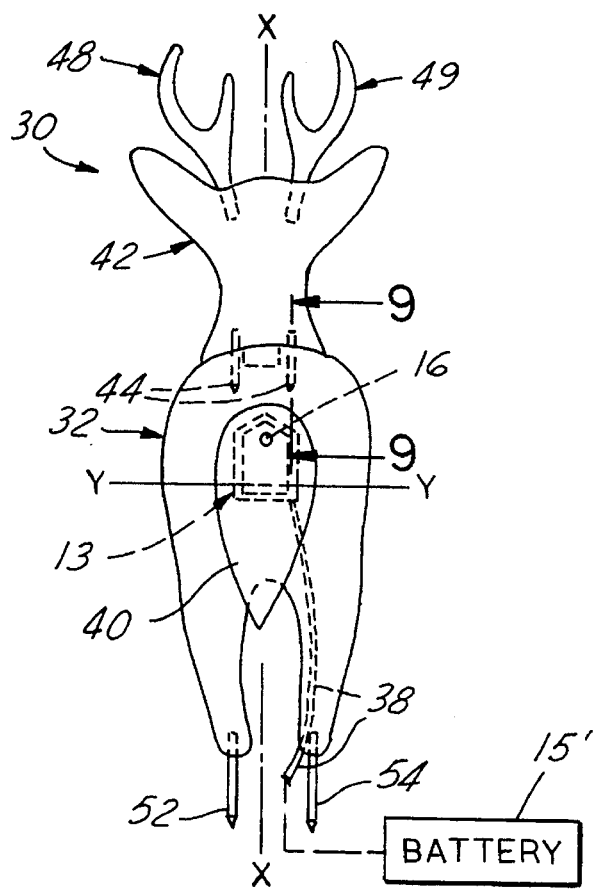
FIG. 7 is an elevational view of a modified embodiment of a deer rear-end simulating a decoy of the invention as viewed along the main viewing axis.
Figure 8:
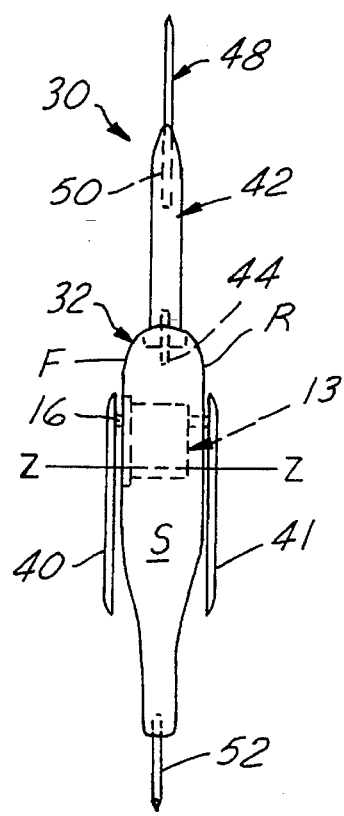
FIG. 8 is a side elevational view of the decoy shown in FIG. 7 as viewed perpendicular to the main viewing axis.
Figure 9:
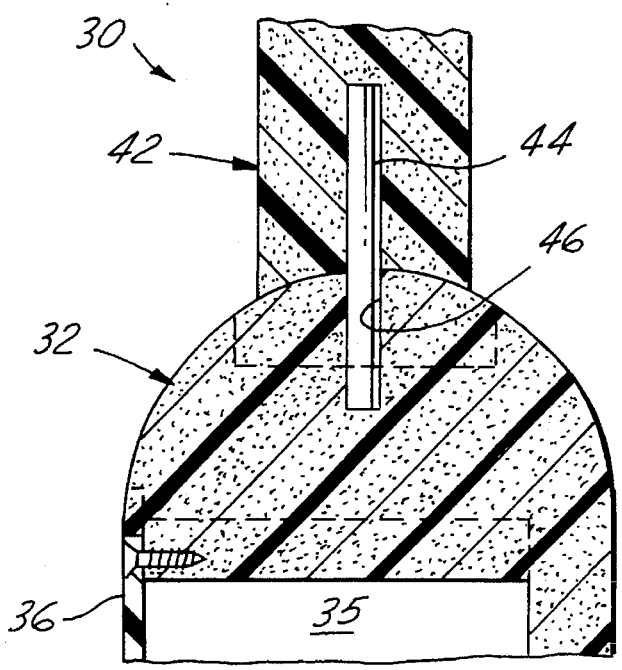
FIG. 9 is a fragmentary sectional view taken along the line 9—9 in FIG. 7.

In the modified form shown in FIGS. 7–9, the plastic decoy 30 comprises a solid body 32 having, as in the first embodiment, opposed three dimensional front and rear surfaces F and R each simulating in life-like fashion the rear-end of a deer when viewed along the main view axis Z (in the plane of the drawing in FIG. 8) and also when viewed from within a limited angular range centered on the Z axis and horizontally divergent therefrom. A portion of the body 34 is hollowed out to provide a cavity 35 (FIG. 9) to receive the electronic device 13. A removable cover 36 is provided to close cavity 35. Preferably a wire 38 extends through a leg to a conventional remote control (not shown) which includes a battery. Solid plastic tails 40 and 41 are mounted on opposite ends 16a and 16b of shaft 16 of the mechanism 13 as in the previously described first embodiment.

In addition, a solid three dimensional head 42 is removably mounted by spaced pins 44 extending onto openings 46 in body 32, and a set of solid plastic antlers 48 and 49 are removable inserted at their lower ends into holes 50 in the head 42.

The solid plastic bodies are preferably formed of high density polystyrene foam.

It can thus be seen that there has been provided a deer decoy which meets the objectives of providing a decoy that is life-like from a limited angle so that no one will notice it or identify it as a deer from a side view, provides a life-like movement of a deer's tail so as to attract the attention of other deer; and which provides the above in a safe manner for either bow hunters or gun hunters using the decoy and taking a hunting position spaced appropriately away from and facing the side of the decoy.

In addition, modified decoy 30 of the second embodiment, being made of solid foam is easily formed and can be readily reproduced using foam casting or injection molding processes. The solid foam material of body 32 also provides improved sound insulation for quieting any noises created by the tail-actuating mechanism 13–16 encased in body cavity 35. Quietness of operation is important in deer hunting because deer are very wily and have an acute sense of hearing. Antlers 48 and 49 as well as head 42 of decoy 30 are preferably cast as solid, one piece monolithic parts. Body 32 may be likewise constructed as a monolithic one-piece part, or cast in two parts to form the front and rear pieces and joined at a centerline similar to body 11 of decoy 10. Decoy 30 may have a pair of leg pins 52 and 54 inserted into drilled or as-cast blind bore openings, one in each of the legs, and permanently affixed therein by suitable adhesive. Leg pins 52 and 54 may be in the form of hollow tubes adapted to telescopically receive separate solid rods 17 for implanting in the ground and onto which tubes 52 and 54 may be individually slipped to hold decoy 30 upright in a standing position suitably spaced above ground level.

From the aforegoing it will also be understood that swinging movement of tails T of decoy 10 or tails 40, 41 of decoy 30 can be imparted in a number of different ways. The tails preferably are conjointly rotatable bodily about the axis of the shaft 16. As will be evident from FIGS. 1, 2, 4, 7 and 8, the decoy tails are also preferably fixed to shaft 16 for rotation therewith at a point closely adjacent the upper end of the tails. Hence the center of gravity of the tails is located at a point spaced well below the rotational axis of shaft 16. Thus when the decoy is mounted up-right in the aforementioned standing position the tails will assume, unless otherwise restrained, a natural position of repose hanging straight down from the rear end of the decoy, i.e., the positions illustrated in the aforemention drawing figures.

Figure 4:
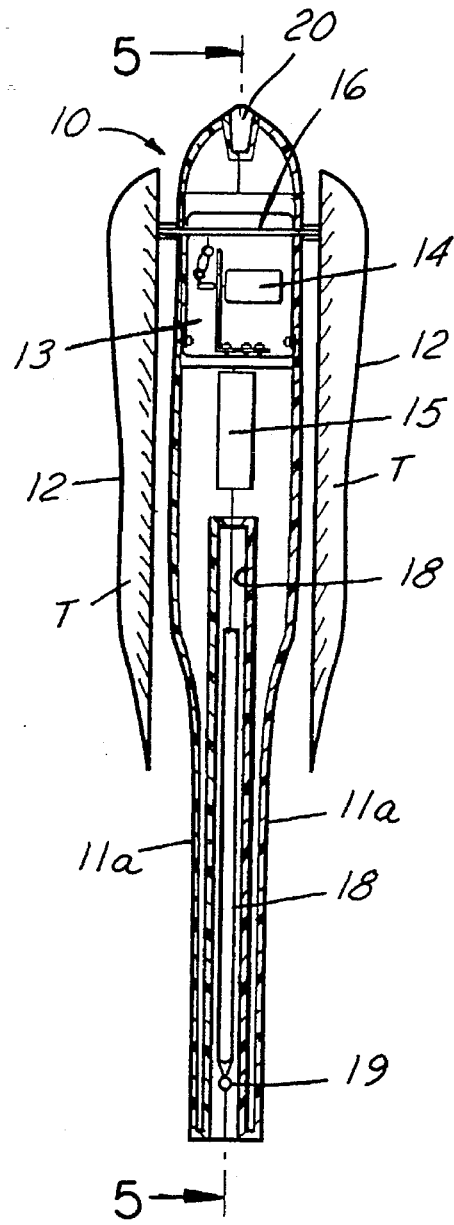
FIG. 4 is a sectional view taken along the line 4—4 in FIG. 3.
Figure 5:
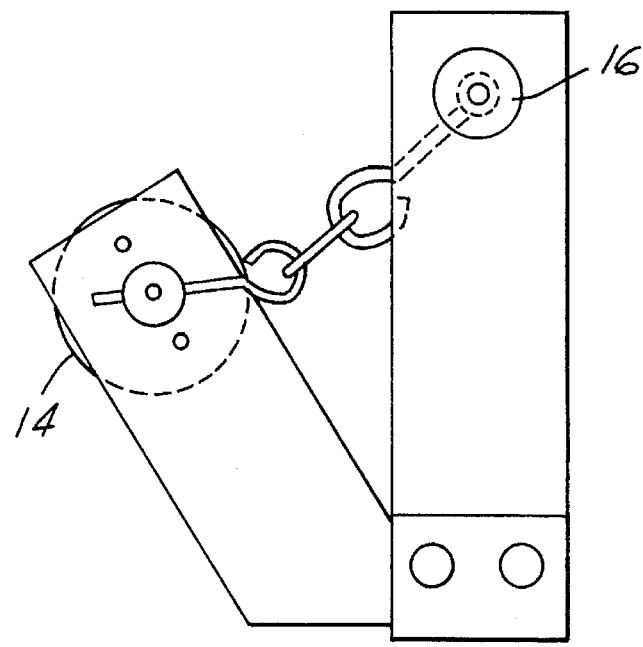
FIG. 5 is a separate elevational view on an enlarged scale of a portion of the tail-actuating mechanism of the deer decoy shown in FIG. 3.
Figure 6:
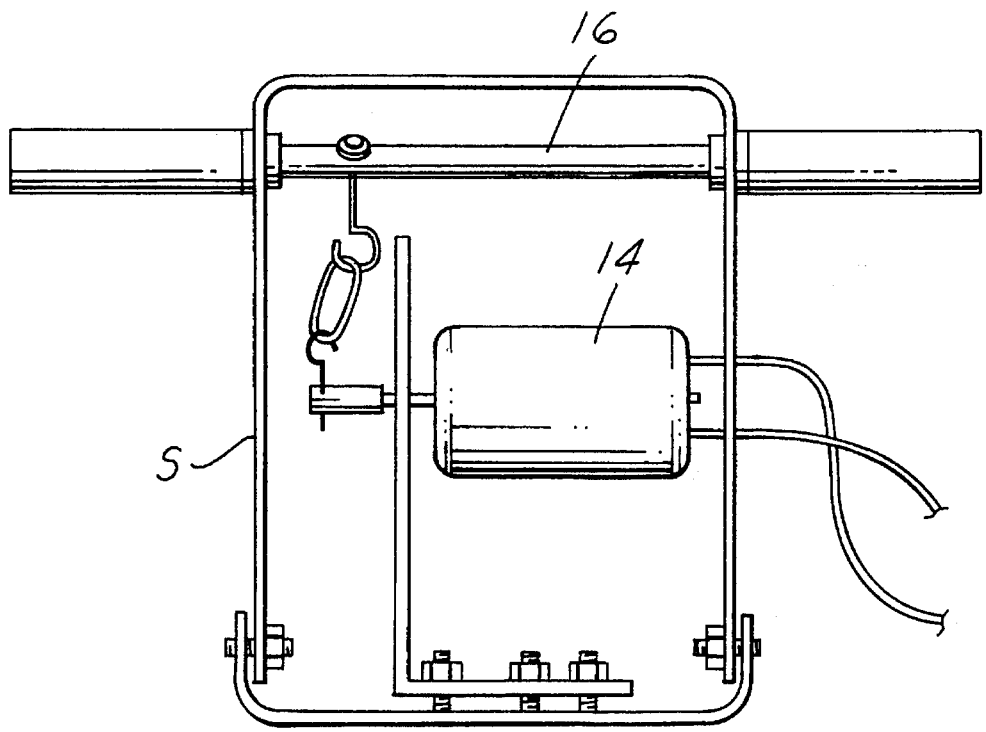
FIG. 6 is a side view on an enlarged scale of a portion the tail-actuating mechanism of the decoy shown in FIGS. 3, 4 and 5.

One way of moving the tails upwardly out of their repose position is by providing the aforementioned electro-mechanical internal drive 13–16 to render the decoy self powering, shown in FIGS. 4, 5 and 6. The electronic device 13 includes a rectangular open-sided frame 60 containing a L-shaped bracket 62 having a lower arm 64 bolted to the bottom leg of frame 60 and having an arm 66 extending upwardly at an inclined angle exteriorly of frame 60 (FIG. 5). Motor 14 is mounted on arm 66 and is operable when energized to rotate a motor drive shaft 68. Motor 14 is operably coupled to rotatably drive shaft 16 by a crank arm hook 70 mounted at one end on shaft 68 for bodily rotation to swing its hook eye through an arc, by a crank arm hook 72 fixed at one end to a central bar portion 16c of shaft 16 for bodily rotation therewith, and by a resiliently yieldable coupling in the form of a rubber band 74 trained at its opposite ends respectively around the eyes of hooks 70 and 72.

As indicated previously, motor 14 may be a 7 amp motor which is powered by a 12 volt battery 15. Suitable conventional electrical circuit components (not shown) may be mounted in frame 60 to control energization of motor 14 from battery 15 to cause rotation of shaft 68. In one form of motorized tail-motion control, the motor control circuit may have a suitable RC periodic timing relay component the resistor of which may be set in increments of anywhere from say 8 to 60 seconds between impulses to periodically re-energize the motor for a period, for example, of 1/100th of a second (i.e.—sufficient to flick the tail from hanging repose to horizontal position). The circuit board also has a pre-set on-timing circuit for opening the motor circuit a short variable time interval (e.g., 0.01 seconds) after current is initially supplied to the motor. Preferably the motor energizing circuit is designed to provide sufficient amperage relative to the motor to cause the motor to quickly swing the tails upwardly out their natural hanging repose position to a raised position, for example, generally horizontal. Rubberband 74 is stretched while transferring the tail lifting forces between crank arm hooks 70 and 72. The automatic RC relay on-timing circuit is set to deenergize motor 14 once the tails have been so lifted. The drive linkage 70, 72 and 74 (FIG. 5) is operable such that hook 72 is pulled by hook 70, via rubberband 74, through approximately a 90° swing (from hanging vertically downwardly clockwise up to horizontal as viewed in FIG. 5). At this point the pull force direction on hook 72 is through its rotational centerline, thus ceasing to exert torque on shaft 16, while simultaneously causing a resistance torque to be imposed via hook 70 on motor 14 to stall the same if still energized.

The tails are then free to drop and commence swinging back through an arc in the manner of a pendulum. The tails then swing back and forth with a damped oscillation motion to thereby simulate the initial flicking and then swinging relaxation of the tail of a real deer. A realistic animated motion is thereby created thereby exposing the white fur areas W (FIG. 1) on the decoy, to attract any deer in the vicinity despite their poor eye sight. The first flicking oscillation of the tail after motor cut off is enhanced by the stretched rubber band and the weight of the raised tail. Rubberband 74 thereafter operates as a balance spring to thus accentuate the diminishing oscillatory motion of the tails until the same return to their vertical hanging position of natural repose. It is to be understood that when motor 14 is de-energized its armature and hence shaft 68 is free to rotate within the constraints of the drive linkage.

Alternatively, control of movement of the tails can be accomplished by providing a conventional manually operated remote control unit (not shown) connected by control wires 38 (FIG. 7) to the battery/motor circuit. The hunter/operator depresses the remote control button to activate the pre-set on-timing electronic control circuit to thereby elevate the tail to the desired raised position. The remote control also functions to de-activate the on-board periodic timing circuit so that tail-flicking is solely under the control of the operator. This on-board on-timing circuit then deenergizes the motor, thereby allowing the tail to be swung down by the forces imparted both by gravity and rubberband 74 to commence the damped oscillatory swinging motion until repose hanging position is once again reached. As shown in FIG. 7, the motor power source, such as a battery 15, can also be located remote from decoy 30 and operably connected by wires 38 to motor 14, and the motor either automatically controlled by the aforementioned body-internal components or manually by the external remote control or a silent switch at the battery.

As a further alternative, one end of a string (not shown) may be attached to one of the tails near its lower end and the other end strung out from one side of the decoy to a suitable hunting blind. When the hunter using the decoy observes live deer approaching within potential viewing range of the decoy the string is pulled just enough to raise tails upwardly against the force of gravity and the yielding resistance of a flexible restraint, such as rubberband 74, preferably located within the deer body cavity. The hunter then releases the string, allowing the tails to commence damped oscillating motion, the rubberband again acting as a balance spring, until such back and forth tail swing ceases and the tails return to their natural repose position hanging straight down, as best seen in FIGS. 1 and 7. Such a pull string can be used as a back-up to an internal motor actuator battery and control system, or all such self-powering components eliminated while retaining only hook 72 and a suitable rubber band 74, connected between hook 72 and another hook stationarily fastened within body cavity 35.

What is claimed is:

1. A deer decoy comprising a plastic body having opposed exterior three-dimensional sculptured sides, each of said exterior sides simulating the rear end of a standing deer, a tail associated with each side and normally dependent therefrom to simulate a relaxed tail-hanging position of repose, and means for moving said tail relative to said body out of the repose position.

2. The deer decoy set forth in claim 1 wherein said tails are mounted adjacent their upper ends on a common shaft for bodily rotation about the axis of the shaft.

3. The deer decoy set forth in claim 2 wherein said means for moving said tail is located on said body.

4. The deer decoy set forth in claim 3 wherein said tail moving means on said body comprises electric motor means operably coupled to said tails for moving the same out of their repose position.

5. The deer decoy set forth in claim 4 wherein said means includes a battery.

6. The deer decoy set forth in claim 5 wherein said means includes an electronic timer operable for controlling the duration of motor energization from said battery.

7. The deer decoy set forth in claim 1 wherein said tail moving means is remotely controlled.

8. The deer decoy set forth in claim 1 wherein said body includes a pair of recesses defining downwardly open channels one along each leg portion of the body rear end, and a pair of decoy support rods for engaging the ground and individually stored in said channels.

9. The deer decoy set forth in claim 8 including a pin removably mounted in each said channel to be removed for permitting the associated rod to be removed and then re-inserted to hold the rod in extended position for engagement with the ground.

10. The deer decoy set forth in claim 1 wherein said body is made of two substantially identical hollow halves joined together.

11. The deer decoy set forth in claim 1 wherein said body comprises a solid body.

12. The deer decoy set forth in claim 11 wherein said deer decoy comprises a solid foam plastic body.

13. The deer decoy set forth in claim 12 wherein said deer decoy includes a solid foam plastic simulated deer head removably mounted atop said body and having opposed main exterior viewing surfaces each simulating the rear of a deer head.

14. The deer decoy set forth in claim 13 including simulated solid foam plastic antlers removable mounted atop said head.

15. The method of making a deer decoy comprising providing a plastic body having opposed sides, each side simulating the rear end of a standing deer, attaching a tail to each side of said body by mounting said tails on a common shaft for bodily rotation of the tails about an axis located near their upper ends such that said tails are gravitationally biased to a hanging position of repose, and providing means for moving said tails relative to said body out of the repose position.

16. The method of forming a deer decoy set forth in claim 15 wherein said step of providing means for moving said tails comprises locating said means within said body.

17. The method of making a deer decoy set forth in claim 16 wherein said step of locating said means within said body comprises providing electric motor means operably coupled to said tails for causing movement of said tails out of their repose position.

18. The method of making a deer decoy set forth in claim 17 wherein said step of providing means for moving the tails further includes positioning a battery within said body operably coupled to supply energizing current to said motor.

19. The method of making a deer decoy set forth in claim 15 wherein said step of providing means for moving said tails comprises attaching an external pull element to said shaft operable for manually remotely imparting motion to said shaft and said tails relative to said body.

20. The method of making a deer decoy set forth in claim 18 wherein said step of providing means for moving the tail includes providing an electronic timer operable for controlling the duration of energizing current supplied to said motor.

21. The method of making a deer decoy set forth in claim 17 wherein said step of providing means for moving a tail comprises providing remote control means operably coupled to said motor for causing motor controlled movement of said tails out of their repose position.

22. The method of making a deer decoy set forth in claim 15 including providing recesses in said body defining a pair of downwardly open channel means one along each leg portion of the rear end, and providing decoy support rods for engaging the ground and telescopically receivable individually in said channels for supporting the decoy in a standing position spaced above the ground.

23. The method of making a deer decoy set forth in claim 22 including making said channels means long enough for telescopically storing the associated support rod completely encased therein, and providing a pin which is removably mounted in each of said channel means such that each pin can be removed for permitting the associated decoy support rod to be removed from storage position and said pin to be reinserted to hold the rod in extended position for engagement of the rod with the ground.

24. The method of making a deer decoy set forth in claim 15 wherein said step of providing said body comprises forming said body of two substantially identical halves and joining said halves together.

25. The method set forth in claim 15 wherein said step of forming said body comprise forming a solid plastic foam body.

26. The method of forming a deer decoy set forth in claim 25 wherein said step of providing means for moving said tails comprises providing tail moving electric motor driving means operably drivingly coupled to said tails and locating said driving means within a cavity in said body at least partially surrounded by the foam material of said body for dampening noise generated by said driving means.

27. The method set forth in claim 15 including providing a head removably mounted atop said body and having opposed main surfaces each simulating the rear of a deer head.

28. The method set forth in claim 27 including providing antlers removably carried atop said head.

29. The method set forth in claim 15 including dimensionally sculpturing the body by dimensioning said body to life-like deer simulating scale along X and Y dimensional coordinates located in a plane perpendicular to a decoy main viewing Z axis, and dimensioning said body along dimensional coordinates on said Z axis at a life-like deer simulating scale greatly reduced relative to the X-Y scale to render the body abnormally thin when viewed along the Y-axis.

30. A deer decoy that comprises:

a body having an exterior three-dimensional sculptured surface simulating the rear end of a deer, a tail exteriorly adjacent to said surface mounted to said body on a shaft for bodily rotation of said tail about an axis of said shaft side-to-side with respect to said body, said axis being located rear the upper end of said tail such that said tail is gravitationally biased to hang downwardly from said shaft in a hanging position of repose, and means coupled to said shaft for rotating said shaft and tail side-to-side about said axis relative to said body out of said repose position.

31. The deer decoy set forth in claim 30 wherein said means comprises an electric motor and a battery for supplying power to said motor.

32. The deer decoy set forth in claim 31 wherein said means includes an electronic timer operable for controlling the duration of motor energization from said battery.

33. The deer decoy set forth in claim 30 wherein said tail moving means is remotely controlled.

\* \* \* \* \*